United States Patent [19]

Hardy et al.

[11] 4,285,846
[45] Aug. 25, 1981

[54] FLATTED WATER-REDUCIBLE COATING COMPOSITIONS AND METHOD FOR PRODUCING SAME

[75] Inventors: John F. Hardy, Andover; Donald P. Kintz, Westford; Vaughn W. Taylor, Lynn, all of Mass.

[73] Assignee: Cabot Corporation, Boston, Mass.

[21] Appl. No.: 144,345

[22] Filed: Apr. 28, 1980

[51] Int. Cl.³ .................. C08L 67/02; C08L 63/00
[52] U.S. Cl. .................. 260/29.2 E; 260/29.2 TN;
260/29.2 EP; 260/29.2 N; 260/29.6 RB;
260/42.55
[58] Field of Search .................. 260/29.2 E, 29.2 EP,
260/29.2 TN, 29.2 N, 42.55, 29.6 PM, 29.6 RB;
106/288 B

[56] References Cited

U.S. PATENT DOCUMENTS

| | | | |
|---|---|---|---|
| 2,598,066 | 5/1952 | Morse | 106/192 |
| 2,625,492 | 1/1953 | Young | 260/37 R |
| 3,354,084 | 11/1967 | Katzer | 260/29.6 S |
| 3,737,402 | 6/1973 | de Vries | 260/29.2 TN |
| 4,001,379 | 1/1977 | Turk et al. | 106/288 B |
| 4,051,094 | 9/1977 | Reuter et al. | 260/42.55 |
| 4,095,994 | 6/1978 | Crawford et al. | 106/288 B |

*Primary Examiner*—Theodore E. Pertilla
*Attorney, Agent, or Firm*—Jack Schuman; Lawrence A. Chaletsky; Barry R. Blaker

[57] ABSTRACT

Disclosed herein are flatted water-reducible coating compositions of the varnish, paint or enamel types, which compositions comprise a water-miscible film forming resin, water as the predominant solvent and a particulate finely-divided silica flatting agent. The method of the invention involves the initial production of a mill paste formulation containing the film forming resin followed by a let-down step employing water as the predominant solvent. The silica flatting agent is introduced into the composition as an aqueous dispersion thereof during or after said let-down step.

15 Claims, 3 Drawing Figures

FLATTED WATER-REDUCIBLE COATING COMPOSITIONS AND METHOD FOR PRODUCING SAME

BACKGROUND OF THE INVENTION

The present invention relates generally to water-reducible film forming coating compositions and is more particularly concerned with flatted coating compositions comprising the combination of a water-miscible film forming resin, water and a finely-divided silica flatting agent.

In recent years substantial efforts have been expended in developing coating compositions containing little or no organic solvents. Such emphasis has, in large measure, been spawned by the desire to reduce the atmospheric pollution, fire, explosion and toxicity hazards which often attend the preparation and use of conventional coating compositions containing organic solvents. Accordingly, there have been developed a number of water reducible coating compositions based upon the combination of a water-miscible film forming resin and water as the predominant solvent, which compositions may be applied to a substrate and cured using conventional techniques and in which the resulting films are durable and bear many or all of the attributes of the prior art organic solvent reduced coating compositions.

It is known that flatting of coating compositions based on conventional organic solvents can generally be achieved by incorporation of an effective amount of a finely-divided silica into the formulation. This is normally accomplished during the mill paste stage of composition preparation wherein the composition solids, including the flatting agent, film forming resin, pigments, bodying agents and the like are milled together to form a well dispersed mill paste. Then, the mill paste is generally subjected to a "let-down" stage of formulation wherein it is diluted with the organic solvent to its finished solids concentration. Unfortunately, it has been found that this general procedure is relatively ineffective for purposes of flatting water-reduced coating compositions comprising a water-miscible film forming resin. Generally, it is found that little or no gloss reduction is achieved at conventional loadings of the silica flatting agent and/or that the amount of a given silica flatting agent required to achieve the desired reduction in gloss is so great as to be either uneconomic or as to cause other problems with the resulting coating composition. In accordance with the present invention, however, this problem has been resolved.

OBJECTS OF THE INVENTION

It is a principal object of the invention to provide novel flatted water-reducible coating compositions comprising water-miscible film forming resins, water as the solvent therefor and finely-divided silica flatting agents.

It is another object of the invention to provide compositions of the above type having good anti-sag properties.

It is still another object of the invention to provide a novel method for formulating flatted water-reducible coating compositions comprising water-miscible film forming resins, water as the solvent therefor, and finely-divided silica flatting agents.

SUMMARY OF THE INVENTION

In accordance with the invention novel flatted water-reducible coating compositions are prepared by forming a mill paste in which the resinous component consists of a water-miscible film forming resin and subsequently letting down said paste with water as the predominant solvent therefor, at least a portion of which solvent comprises an aqueous dispersion of a finely-divided particulate silica flatting agent.

THE DRAWING

DESCRIPTION OF PREFERRED EMBODIMENTS

Figure 1:
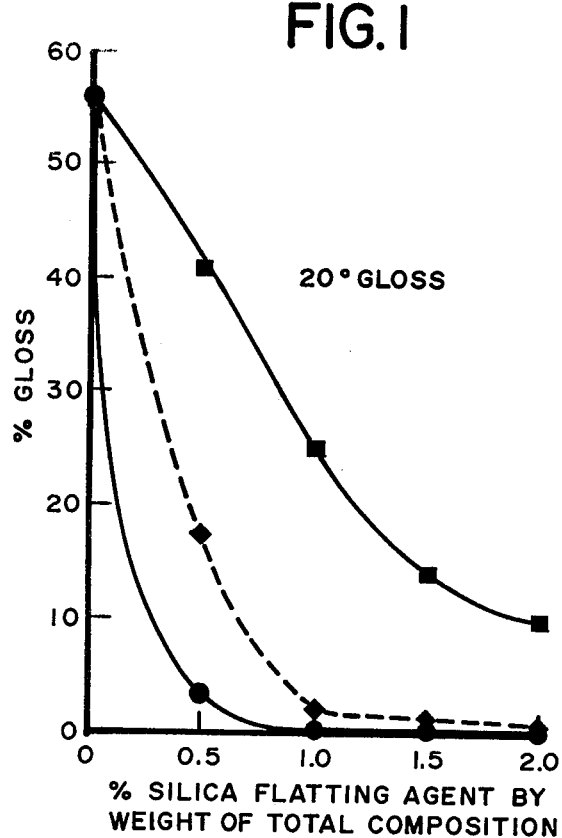
FIG. 1 is a graph on which there are plotted 20° specular gloss data achieved in accordance with Examples 1 through 3 hereof.

Film forming resins which can be employed in the compositions of the invention are generally any resinous film formers which are miscible in water or which can be treated in such manner as to render them miscible in water preparatory to let-down of the mill paste with the water solvent therefor. Typical film forming resins found suitable for the preparation of the water-reducible coating compositions of the invention can be selected from the genera of: alkyd resins, alkyd/amino resin blends, acrylic resins, epoxy resins, epoxy ester resins, styrene-acrylic resin copolymers, polyester resins, vinylidene chloride-acrylic resin copolymers and urethane resins. As mentioned, certain resins, such as alkyd resins, can be treated (such as by neutralization with a base) to render them miscible in water. In this regard, it should be recognized that the film forming resins of the compositions of the invention are required to be miscible, as opposed to simply dispersible, in water. Accordingly, those film forming resins conventionally employed in the preparation of latex coating compositions (in which the resin is merely dispersed to a fine state of subdivision within the aqueous matrix) are not intended to be included within the ambit of the present invention unless first further treated to render them miscible in water.

The water based solvents of the compositions of the invention are, as mentioned, at least predominantly composed of water. Organic co-solvents, such as, for instance, butyl carbitol or other relatively small polar organic molecules, may also form a minority part of the solvent. However, when so employed, the overall solvent should comprise at least 75 percent by weight of water and no more than about 25 percent by weight of such organic co-solvent.

The silica flatting agents useful in the compositions of the invention are generally well recognized by those of skill in the coating composition art. Generally speaking, it is sufficient that the silica be of finely-divided particulate character. Such silicas can be produced by a number of known processes such as by precipitation from solution of an alkali metal silicate or by vapor phase conversion of a silicon-containing compound at high temperature. The latter, the products of which are often termed "pyrogenic" silicas, are usually produced by high temperature (above about 800° C.) oxidation and/or hydrolysis of a silicon compound such as silicon tetrachloride, silicon tetrafluoride, silicon disulfide, methyltrichlorosilane and the like. Further details of pyrogenic silica producing processes can be had by reference to: U.S. Pat. Nos. 2,428,178, Reik et al.; 2,990,249, Wagner; 3,024,089, Spencer et al.; 3,043,660, Hughes, et al.; 3,053,627, Flemmert; 3,086,851, Wagner; 3,130,008, Stokes, et al.; 3,203,759, Flemmert and 3,416,890, Best et al. As mentioned, the precipitated silicas are produced by the acidulation or neutralization of aqueous alkali metal silicate solutions. Said acidulation or neutralization results in precipitation of a silica hydrosol which may be aged to a gel or semi-gel state, the sol or gel washed free of alkali metal salts, filtered, dried and ground to a colloidal impalpable powder. Further details relating to various permutations of the generalized precipitated silica process outlined above can be had by reference to: U.S. Pat. Nos. 2,865,777, Allen et al.; 2,913,419, Alexander; 2,995,422, Atkinson et al.; 3,010,791, Allen; 3,034,913, Lagerstrom; 3,172,726, Burke, Jr. et al; 3,822,216, Schaefer and 3,342,747, Mindick et al. An improvement upon the general precipitated silica process is represented by the so-called "silica aerogel process" in which the aqueous reaction medium in which the precipitation is undertaken to the hydrogel state is first replaced with an alcohol and the alcohol thereafter bled off from the system under pressure and at or above the critical temperature thereof. In this manner, the gel state of the precipitated silica is preserved and the silica product is not subjected to the reticulating forces usually generated during the filtration and drying of a water wet filter cake. These silica aerogel products have found wide prior utility as flatting agents in organically solvated coating compositions. For further details relating to the silica aerogel process reference may be had to U.S. Pat. Nos. 2,093,454, Kistler and 2,993,005, Kosmin et al. In general, we prefer to use as the flatting agent in the compositions of the present invention a pyrogenic silica, particularly those pyrogenic silicas produced by vapor phase flame hydrolysis of one or more silicon halides. This is so because such pyrogenic silicas are not only efficient flatting agents in the compositions of the invention, but also their presence tends to significantly improve the sag resistance properties of the wet composition films.

The quantity of the silica flatting agent to be employed is subject to considerable variation and will depend upon such considerations as the concentration of water-miscible film forming resin present in the finished composition, the specific type of film forming resin employed, the specific finely-divided silica flatting agent employed, the presence and quantities of other solid and liquid ingredients forming part of the finished coating composition and the extent of flatting or gloss reduction desired to be achieved. Generally speaking, however, we have found that concentrations of the silica flatting agent of between about 0.25 to about 5 percent by weight of the finished coating composition are effective in achieving the desired degree of flatting effect. In the case of pyrogenic silica flatting agents, quantities of between 0.3 and 2.0 percent by weight of the total finished coating composition have been found to be effective in terms of flatting efficiency and quantities of as little as 0.6% of pyrogenic silica by weight of the total coating composition have been found to provide effective anti-sag properties.

While by no means necessary to the achievement of the broad goals and objects of the present invention, it is preferred that the finished coating composition also comprise a minor amount, say on the order of between about 10 and about 30% of the dry weight of the silica flatting agent thereof, of a nonionic surfactant. The presence of a nonionic surfactant in the coating composition of the invention tends to maximize the anti-sag effect of the silica flatting agent. In the performance of this preferred embodiment of the invention the nonionic surfactant is desirably incorporated into the coating composition as a final step in the let-down of the mill paste, thereby to avoid potential foaming problems were it to be incorporated into the composition at an earlier stage of its preparation.

Of course, other ingredients conventional in the coating arts can also form part of the compositions of the invention. These include, but are not limited to, driers, accelerators, pigments, extenders, opacifiers, retarders, anti-ozonants anti-skinning agents and anti-foam agents.

The preparation of the silica flatting agent predispersion for use in the let-down step can be achieved simply by stirring of a dry particulate silica flatting agent into the water solvent for the composition. It is much preferred, however, that this predispersion of the dry silica be prepared under intensive mixing conditions such as are generated in such equipments as homogenizers, high speed blenders, attritors and the like. This generally assures excellent dispersion of the flatting agent. Where the silica is originally supplied as a dispersion thereof in water, such as is the case with the silica aquasols of commerce, they may, of course, be employed without further treatment thereof.

There follow a number of illustrative non-limiting examples.

EXAMPLE 1

A number of white gloss enamel mill pastes were prepared, each employing the following ingredients, in the stated amounts, shown in the Table. The mill pastes were prepared on a Premier Dispersator, a high shear mixer, at 3663 ft./min. for 15 minutes. The first addition was added to the mixing mill paste and dispersed at 3663 ft./min. for an additional 5 minutes. The letdown was added at low shear (800 ft./min.). The five sample formulations designated A, B, C, D and E contained 0%, 0.5%, 1.0%, 1.5% and 2.0% CAB-O-SIL, respectively, based on the total weight of the formulations. The finely-divided silica flatting agent predispersion employed for each of the let-downs was prepared by high speed agitation, in a Waring Blendor, of a mixture of 470 grams of water and 30 grams of CAB-O-SIL ® PTG fumed silica (a pyrogenic silica flatting agent produced by high-temperature flame hydrolysis of a silicon halide feedstock and having an average ultimate particle diameter of less than about 10 millimicrons) manufactured by Cabot Corporation, Boston, Massachusetts.

TABLE

| Sample | Amount (Grams) | | | | |
| --- | --- | --- | --- | --- | --- |
| | A | B | C | D | E |
| Mill Paste | | | | | |
| Kelsol 3905[1] | 248.0 | 248.0 | 248.0 | 248.0 | 248.0 |
| TiO R-902[4] (Dupont) | 216.3 | 211.6 | 206.5 | 201.7 | 196.8 |
| Talc 399[5] | 81.2 | 78.1 | 74.7 | 71.5 | 68.3 |
| 1st Addition | | | | | |
| Kelsol 3905 | 46.8 | 46.8 | 46.8 | 46.8 | 46.8 |
| Cobalt Hydrocure[2] Manganese | 2.2 | 2.2 | 2.2 | 2.2 | 2.2 |

TABLE-continued

| Sample | Amount (Grams) | | | | |
|---|---|---|---|---|---|
| | A | B | C | D | E |
| Hydrocure[3] Let Down | 2.5 | 2.5 | 2.5 | 2.5 | 2.5 |
| Triethylamine | 19.1 | 19.1 | 19.1 | 19.1 | 19.1 |
| Flatting Agent (6% Silica Dispersion) | — | 87.3 | 174.1 | 263.2 | 346.7 |
| Butyl Carbitol | 16.2 | 16.2 | 16.2 | 16.2 | 16.2 |
| Water | 415.8 | 333.6 | 252.1 | 168.4 | 89.8 |
| Triton X-100[6] | — | 0.7 | 1.4 | 2.1 | 2.7 |
| | 1048.1 | 1046.1 | 1043.6 | 1041.7 | 1039.1 |
| Pigment Volume Concentration | 29.3% | 29.3% | 29.8% | 29.8% | 29.3% |
| Weight Per Gallon (Pounds) | 10.48 | 10.46 | 10.44 | 10.42 | 10.39 |

[1] a water-miscible (upon neutralization with an amine) alkyd resin manufactured by the Spencer-Kellogg Division of Textron, Inc., Buffalo, N. Y.
[2] a cobalt based drier manufactured by Mooney Chemicals, Inc., Cleveland, Ohio.
[3] a manganese based drier manufactured by Mooney Chemicals, Inc., Cleveland, Ohio.
[4] titanium dioxide pigment manufactured by E. I. Dupont de Nemours, Wilmington, Delaware.
[5] a mineral talc filler manufactured by Whittaker, Clark and Daniels, Inc., Plainfield, N. J.
[6] octylphenoxypolyethylene oxide manufactured by Rohm and Haas, Inc., Philadelphia Pa.

Three-mil thick draw-downs were prepared on Leneta sealed charts utilizing the enamel sample formulations prepared in accordance with the above. The wet films were then cured and the cured enamel films then tested in accordance with ANSI/ASTM D 523-67 for specular gloss at receptor angles of 20°, 60° and 75° utilizing a Gardner glossmeter. The data is plotted in FIGS. 1 through 3 hereof, respectively, utilizing the symbol ( ) to designate the data points of the resulting curves.

Additional draw-downs were prepared on Leneta Sag Levelling charts, employing a 3-12 Leneta Anti-Sag Meter ® draw-down blade (The Leneta Company, Ho-Ho-Kus, N.J.) and visually evaluated. Samples B. through E, inclusive, displayed good to excellent anti-sag properties.

EXAMPLE 2

This example is essentially a duplicate of Example 1 with the exception that the flatting agent employed was OK-412, a wet process finely-divided flatting agent silica produced by Degussa, Inc., Teterboro, N.J.

Figure 2:
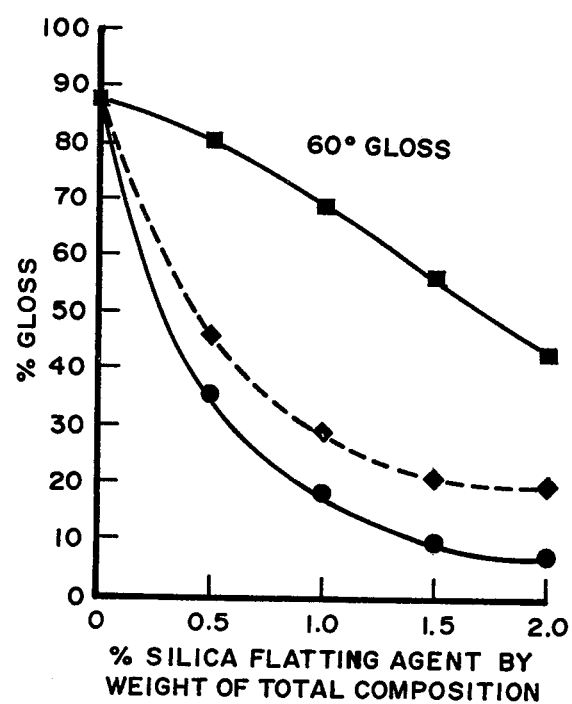
FIG. 2 is a graph on which there are plotted 60° specular gloss data achieved in accordance with Examples 1 through 3 hereof.
Figure 3:
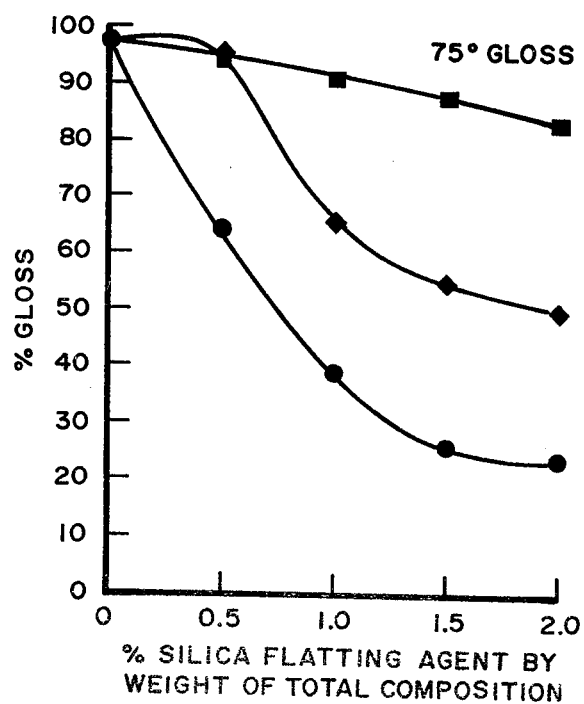
FIG. 3 is a graph on which there are plotted 75° specular gloss data achieved in accordance with Examples 1 through 3 hereof.

Glossmeter data is plotted in the graphs of FIGS. 1 through 3, hereof, the data points of the curves being designated by the symbol, ( ).

The anti-sag properties of the sample enamels were evaluated and it was determined that said properties were substantially deficient, on an equal silica concentration basis, to those of the compositions of Example 1.

EXAMPLE 3

This example is essentially a duplicate of Example 1 with the exception that the silica flatting agent employed was Syloid 72, a finely-divided precipitated silica produced by W. R. Grace and Company, Davison Division, Baltimore, Md.

Glossmeter data is presented in FIGS. 1 through 3, hereof, the data points of the resulting curves being designated by the symbol, ( ).

The anti-sag properties of the samples were determined to be generally similar to those of the sample compositions of Example 2.

Obviously, many changes may be made in the above detailed description and examples of the invention without departing from the essential spirit and scope thereof. For instance, the let-down step may be accomplished in one or more stages whereby the mill paste is first let-down with a predominantly water based solvent and thereafter even further let-down with an aqueous predispersion of the silica flatting agent. In this manner water reduced gloss enamels, paints and varnishes may be prepared, packaged and sold by the coatings manufacturer for ultimate use as gloss, semi-gloss or flat coating compositions. The flatting of such water reduced gloss coating compositions can be undertaken by the ultimate consumer thereof simply by further letting down of the water reduced gloss coating composition with an aqueous dispersion of the finely-divided silica flatting agent. Also, water-miscible film forming resins other than the alkyd resin specifically mentioned in the working examples hereof can also be utilized.

Accordingly, although specific preferred embodiments of the invention have been described in detail above, the description is not intended to limit the invention to these embodiments since they are intended to be construed as illustrative rather than as restrictive or limiting. The invention, therefore, is not to be limited to the details disclosed in the foregoing description but may be modified within the scope of the appended claims.

What is claimed is:

1. In a method for preparing a water-reducible coating composition comprising the steps of preparing a mill paste of the coating solids, including a water-miscible film forming resin, and thereafter letting down said mill paste with a predominantly aqueous solvent comprising at least 75 percent by weight of water, the improvement which comprises:
   flatting the composition by admixing therewith an aqueous dispersion of a finely-divided particulate silica flatting agent during or subsequent to said let-down of said mill paste, the quantity of said silica flatting agent so admixed being between about 0.25 and about 5 percent by weight of the total composition.

2. The method of claim 1 wherein said silica flatting agent is a pyrogenic silica.

3. The method of claim 2 wherein said pyrogenic silica is produced by vapor phase flame hydrolysis of silicon halide feedstock.

4. The method of claim 3 wherein the quantity of pyrogenic silica flatting agent employed is sufficient to provide a concentration thereof of from 0.3 to 2 percent by weight of the total composition.

5. The method of claim 1 wherein said aqueous dispersion of finely-divided particulate silica flatting agent is prepared by intensive mixing of said silica flatting agent with a volume of water.

6. The method of claim 1 wherein, in addition, there is incorporated into the water-reducible coating composition a minor amount of a nonionic surfactant.

7. The method of claim 1 wherein the amount of said nonionic surfactant is between about 10 and about 30% of the dry weight of the silica flatting agent.

8. A flatted water-reducible coating composition comprising a water-miscible film forming resin, water as the predominant solvent therefor and finely-divided particulate silica flatting agent, said composition having been prepared by forming a mill paste of the composition solids, including said water-miscible film forming resin, thereafter letting down said mill paste with an aqueous solvent comprising at least 75% by weight water and during said let-down, or later, admixing said composition with an aqueous dispersion of said silica flatting agent, the quantity of said silica flatting agent so admixed being sufficient to provide a concentration thereof of between about 0.25 and about 5% by weight of the total composition.

9. The flatted composition of claim 8 in the nature of a pigmented paint or enamel.

10. The flatted composition of claim 8 in the nature of an unpigmented varnish.

11. The flatted composition of claim 8 wherein said silica flatting agent is a pyrogenic silica.

12. The flatted composition of claim 11 wherein said pyrogenic silica is produced by vapor phase flame hydrolysis of silicon halide feedstock.

13. The flatted composition of claim 11 wherein said pyrogenic silica flatting agent is present in the amount of between 0.3 to 2 percent by weight of the total composition.

14. The flatted composition of claim 8 comprising, in addition, a minor amount of a nonionic surfactant.

15. The flatted composition of claim 8 wherein the amount of said nonionic surfactant is between about 10 and about 30% of the dry weight of said silica flatting agent.

* * * * *

UNITED STATES PATENT AND TRADEMARK OFFICE
CERTIFICATE OF CORRECTION

PATENT NO. : 4,285,846
DATED : August 25, 1981
INVENTOR(S) : John F. Hardy; Donald P. Kintz; Vaughn W. Taylor It is certified that error appears in the above–identified patent and that said Letters Patent are hereby corrected as shown below:

Example 1, Col. 5, l. 33, insert the symbol -- ● -- between the parentheses "( )".

Example 2, Col. 5, l. 48, insert the symbol -- ◆ -- between the parentheses "( )".

Example 3, Col. 5, l. 63, insert the symbol -- ■ -- between the parentheses "( )".

Signed and Sealed this

Third Day of November 1981

[SEAL]

Attest:

GERALD J. MOSSINGHOFF

Attesting Officer

Commissioner of Patents and Trademarks